(12) United States Patent
Moynihan et al.

(10) Patent No.: US 11,987,490 B1
(45) Date of Patent: May 21, 2024

(54) PREDICTIVE BLENDING OF OXYGENATED GASOLINE

(71) Applicant: PHILLIPS 66 COMPANY, Houston, TX (US)

(72) Inventors: James C. Moynihan, St. Louis, MO (US); Paul M. Ryder, Owasso, OK (US); Robert L. Schnefke, Houston, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 18/428,485

(22) Filed: Jan. 31, 2024

Related U.S. Application Data (62) Division of application No. 18/506,564, filed on Nov. 10, 2023.

(51) Int. Cl.
*B67D 7/36* (2010.01)
*B67D 7/74* (2010.01)
*G05D 11/13* (2006.01)

(52) U.S. Cl.
CPC ............... *B67D 7/744* (2013.01); *B67D 7/36* (2013.01); *G05D 11/139* (2013.01); *B67D 2007/745* (2013.01)

(58) Field of Classification Search
CPC .... B67D 7/36; B67D 7/744; B67D 2007/745; G05D 11/139
See application file for complete search history.

(56) References Cited

U.S. PATENT DOCUMENTS

| | | | | |
|---|---|---|---|---|
| 4,543,819 A | * | 10/1985 | Chin | G01N 7/14 |
| | | | | 137/88 |
| 5,223,714 A | * | 6/1993 | Maggard | G01N 33/2829 |
| | | | | 436/55 |
| 7,032,629 B1 | | 4/2006 | Mattingly et al. | |
| 7,631,671 B2 | | 12/2009 | Mattingly et al. | |
| 8,176,951 B2 | | 5/2012 | Mattingly et al. | |
| 9,207,686 B2 | | 12/2015 | Mattingly et al. | |
| 9,321,977 B2 | | 4/2016 | Vanderbur | |
| 9,494,948 B2 | | 11/2016 | Mattingly et al. | |
| 9,939,821 B2 | * | 4/2018 | Wadhwa | G05D 11/00 |
| 10,246,656 B2 | | 4/2019 | Mattingly et al. | |
| 10,428,289 B2 | | 10/2019 | Vandurbur | |
| 2011/0160921 A1 | * | 6/2011 | Petit | G05D 11/139 |
| | | | | 700/285 |
| 2019/0177629 A1 | | 6/2019 | Mattingly et al. | |

* cited by examiner

Primary Examiner — Paul J Gray
(74) Attorney, Agent, or Firm — Phillips 66 Company (57) ABSTRACT

Processes for blending at least one finished gasoline from a refined petroleum product comprising at least one neat gasoline with ethanol and optionally butane utilizing a blend model that calculates a volumetric blend ratio comprising at least one neat gasoline, ethanol and optionally, butane. The blend model utilizes estimated values for the octane number and the volatility of the ethanol and butane when calculating the volumetric blend ratio.

13 Claims, 2 Drawing Sheets

PREDICTIVE BLENDING OF OXYGENATED GASOLINE

CROSS-REFERENCE TO RELATED APPLICATIONS

This application is a non-provisional divisional application that claims the benefit of the filing date of prior-filed U.S. Utility application Ser. No. 18/506,564 filed on Nov. 10, 2023, titled "Predictive Blending of Oxygenated Gasoline". The prior-filed application is hereby incorporated by reference in its entirety.

STATEMENT REGARDING FEDERALLY SPONSORED RESEARCH OR DEVELOPMENT

None.

FIELD OF THE INVENTION

This invention relates to method and systems for blending butane and ethanol into gasoline.

BACKGROUND OF THE INVENTION

Finished gasolines must meet government specifications for maximum vapor pressure that varies according to season and geographic location. Refiners attempt to approach this limit as closely as possible (without exceeding the limit) in order to maximize gasoline production. However, the difference between the actual vapor pressure of produced finished gasoline and the maximum allowable gasoline vapor pressure is a significant lost opportunity for a modern petroleum refinery.

Commercial gasoline blending to meet maximum volatility specifications often involves volatility measurements of not only one or more gasoline blendstocks, but also the ethanol and butane streams to be added to produce a finished gasoline. However, real-time contemporaneous monitoring of the volatility of all blendstock streams utilized to produce a finished gasoline increases operational cost and margin giveaway.

What is needed are systems and processes that can rapidly and accurately blend a finished gasoline to meet all government specifications at decreased cost, and without excess volatility, by obtaining real-time vapor pressure and distillation temperature measurements for a neat gasoline stream blendstock for oxygenate blending (BOB) to be blended into a finished gasoline, while utilizing standard assumptions (or estimates) for the volatility of the butane stream and the ethanol stream to produce the finished gasoline.

BRIEF SUMMARY OF THE DISCLOSURE

Some embodiments comprise a system comprising: a first pipe capable of flowing a neat gasoline and comprising a first valve capable of regulating flow through the gasoline pipe at a known rate; a second pipe capable of flowing ethanol and comprising a second valve capable of regulating flow of the ethanol at a known rate; a third pipe capable of flowing butane and comprising a third valve capable of regulating flow through the third pipe at a known rate; a first analyzer comprising a first analyzer cell that is capable of receiving and analyzing a first sample of the neat gasoline from the first pipe to determine a neat gasoline vapor pressure; a second analyzer comprising an second analyzer cell that is capable of receiving and analyzing a second sample of the neat gasoline from the first pipe to determine a neat gasoline distillation temperature; a programmable logic controller capable of continuously calculating a volumetric blend ratio of the neat gasoline, the ethanol and the butane needed to produce a finished gasoline, where the volumetric blend ratio at least partly depends on the neat gasoline vapor pressure, the neat gasoline distillation temperature, a pre-determined volatility value for the ethanol and a pre-determined volatility value for the butane, wherein each volatility value is selected from a vapor pressure, a distillation temperature and a liquid-to-vapor ratio temperature; a receptacle downstream of the first pipe the second pipe and the third pipe that is capable of receiving and blending the neat gasoline, the ethanol, and the butane to produce a finished gasoline, wherein the programmable logic controller is capable of operating the first valve, the second valve, the third valve to implement the volumetric blend ratio in the receptacle.

In some embodiments of the system, the distillation temperature is selected from a 10 percent distillation temperature, a 50 percent distillation temperature and a 90 percent distillation temperature.

In some embodiments of the system, the first pipe comprises a first flow meter downstream from the first valve that is operable to obtain a first flow measurement, where the second pipe comprises a second flow meter downstream from the second valve that is that is operable to obtain a second flow measurement, and the third pipe comprises a third flow meter downstream from the third valve that is operable to obtain a third flow measurement, where the programmable logic controller is operable to utilize the first flow measurement, the second flow measurement and the third flow measurement to implement the volumetric blend ratio in the receptacle.

In some embodiments of the system, the finished gasoline is selected from a finished premium octane blended gasoline, a finished mid-grade octane blended gasoline and a finished regular octane blended gasoline.

Some embodiments comprise a process, comprising: flowing of a neat gasoline through a first pipe comprising a first valve that regulates the flowing of the neat gasoline into a receptacle; flowing ethanol through a second pipe comprising a second valve that regulates the flowing of the ethanol into the receptacle; flowing butane through a third pipe comprising a third valve that regulates the flowing of the butane into the receptacle; analyzing a sample of the neat gasoline periodically to obtain a neat gasoline vapor pressure and a neat gasoline distillation temperature; calculating a volumetric blend ratio of the neat gasoline, the ethanol and the butane needed to produce a finished gasoline, where the calculating occurs periodically and accounts for the at least two volatility measurements of the neat gasoline, an estimated volatility value for the ethanol and an estimated volatility value for the butane when calculating the volumetric blend ratio, wherein each volatility value is selected from a vapor pressure, a distillation temperature and a liquid-to-vapor ratio temperature; blending a finished gasoline comprising the neat gasoline, the ethanol and the butane by implementing the volumetric blend ratio via operation of the first valve, the second valve and the third valve to produce the finished gasoline in the receptacle, where the finished gasoline meets all government volatility-related specifications for a finished gasoline and is selected from a finished premium octane blended gasoline, a finished mid-grade octane blended gasoline, and a finished regular octane blended gasoline.

In some embodiments of the process, the distillation temperature is selected from the group consisting of a 10 percent distillation temperature, a 50 percent distillation temperature and a 90 percent distillation temperature.

In some embodiments of the process, the flowing of each of the neat gasoline, the ethanol and the butane is performed at a known rate.

In some embodiments of the process, implementing the volumetric blend ratio additionally comprises obtaining a neat gasoline volume from a first flow meter in the first pipe, obtaining an ethanol volume from a second flow meter in the second pipe, and obtaining a butane volume from a third flow meter in the third pipe.

In some embodiments of the process, the government volatility-related specifications comprise vapor pressure, a 50 percent distillation temperature and a 20:1 vapor to liquid ratio temperature. In some embodiments of the process, the periodically calculating occurs at a frequency of at least once per minute.

In some embodiments of the process, the finished gasoline is selected from the group consisting of a finished premium octane blended gasoline, a finished mid-grade octane blended gasoline, and a finished regular octane blended gasoline.

Some embodiments comprise a method for blending a finished gasoline, comprising: flowing of a neat gasoline through a first pipe comprising a first valve that regulates the flowing of the neat gasoline into a receptacle; flowing ethanol through a second pipe comprising a second valve that regulates the flowing of the ethanol into the receptacle; flowing butane through a third pipe comprising a third valve that regulates the flowing of the butane into the receptacle; analyzing a sample of the neat gasoline periodically to obtain a neat gasoline vapor pressure and a neat gasoline distillation temperature; calculating a volumetric blend ratio of the neat gasoline, the ethanol and the butane needed to produce a finished gasoline using a programmable logic controller that periodically executes programing comprising an algorithm that calculates the first volumetric blend ratio, wherein the algorithm accounts for the neat gasoline vapor pressure, the neat gasoline distillation temperature, a pre-determined volatility value for the ethanol and a pre-determined volatility value for the butane, wherein each volatility value is selected from a vapor pressure, a distillation temperature and a liquid-to-vapor ratio temperature; producing a finished gasoline in the receptacle that comprises the neat gasoline, the ethanol and the butane, wherein the programmable logic controller operates the first valve, the second valve and the third valve to implement the volumetric blend ratio, wherein the finished gasoline meets all volatility-related specifications for a finished gasoline and is selected from a finished premium octane blended gasoline, a finished mid-grade octane blended gasoline, and a finished regular octane blended gasoline.

In some embodiments of the process, the volatility-related specifications comprise vapor pressure, a 50 percent distillation temperature and a 20:1 vapor to liquid ratio temperature. In some embodiments of the process, the distillation temperature is selected from the group consisting of a 10 percent distillation temperature, a 50 percent distillation temperature and a 90 percent distillation temperature.

In some embodiments of the process, the flowing of each of the neat gasoline, the ethanol and the butane is performed at a known rate.

In some embodiments of the process, the first pipe comprises a first flow meter downstream from the first valve that obtains a first flow measurement, wherein the second pipe comprises a second flow meter downstream from the second valve that obtains a second flow measurement, and the third pipe comprises a third flow meter downstream from the third valve that obtains a third flow measurement, wherein the programmable logic controller utilizes the first flow measurement, the second flow measurement and the third flow measurement to implement the volumetric blend ratio in the receptacle.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Gasoline production typically involves blending several blendstocks that originate from a petroleum refinery. In addition to refinery-derived blendstocks, refineries may also procure gasoline blend components from non-refinery sources, such as natural gasoline from crude oil/natural gas production, low octane naphtha from petrochemical aromatics operations, aromatics (primarily toluene), heavy aromatic by-products of petrochemical aromatics operations, MTBE (for gasoline exports), miscellaneous imported gasoline components and transmix gasoline obtained from pipeline operations. The streams that provide blendstocks for production of neat gasoline (i.e., undiluted with ethanol) generally include the following:

Light Straight Run Naphtha (LSR) is a high volatility, low octane component produced directly from crude oil distillation.

Isomerate is a high volatility moderate octane component. The isomerization process increases octane by converting straight chain paraffinic (low octane) species to branched or iso species (higher octane).

Reformate is a low volatility, high octane component produced via catalytic reforming of heavy naphtha from crude distillation. The reforming process takes very low octane naphtha and increases its octane level by converting straight paraffin compounds to branched and cyclic naphthene compounds and converting these and other feed naphthenes into high octane aromatics.

Catalytically cracked gasoline (FCC gasoline) is a moderate volatility component with octane in the general range of average finished gasoline. The FCC cracks large compounds in heavy gas oil and, in some cases, crude oil bottoms, yielding products in the gasoline and distillate range. Olefins from the FCC feed alkylation units.

Alkylate is a moderate volatility component with octane rating typically falling somewhere between regular and premium grade market octane. Alkylate is produced by combining light olefins from the FCC (butylene and propylene) with isobutane to produce largely C7 to C9 branched paraffins.

Butane and pentane are used in limited quantities to achieve maximum allowable Reid vapor pressure (RVP) according to government regulations that vary depending upon geographic location and season.

Finished gasoline meets US Environmental Protection Agency requirements for use in light-duty and medium-duty gasoline-powered vehicles. However, these specifications include relatively few parameters/properties that can be met using a variety of different blendstocks. Thus, the blendstocks listed above may be combined in different proportions to produce a neat gasoline or blendstock for oxygenate blending (BOB) that has varying volatility depending upon the mixture of hydrocarbon streams utilized to make it.

Optimization of the gasoline blending process must consider a variety of characteristics of both the blendstocks and the resulting gasoline. Among others, such characteristics can include cost and various measurements of volatility, octane, and chemical composition. Producing differentiated gasolines in this manner allows mid-grade and premium grade gasolines to be produced at a terminal on demand, rather than requiring the shipment of batches of every gasoline grade to the terminal for storage and later distribution. Producing mid-grade and premium grade gasolines in this manner can substantially reduce pipeline shipping volumes and inventory requirements and can increase product slate flexibility at the terminal.

One hydrocarbon stream that is advantageously utilized as a gasoline blend stock is butane. Butane is abundant in most refineries and has an octane number that typically increases the overall octane number of the finished gasoline. However, the quantity of butane in the blend is typically limited by government specifications that regulate the maximum vapor pressure and/or other volatility properties of a finished gasoline.

Although hydrocarbons usually represent a major component of gasoline, it has been found that certain oxygen containing organic compounds can be advantageously included as gasoline components. These oxygen containing organic compounds are referred to as oxygenates, and they are useful as gasoline components because they are usually of high octane and may be a more economical source of gasoline octane than a high-octane hydrocarbon blending component such as alkylate or reformate. Oxygenates which have received substantial attention as gasoline blending agents include ethanol, t-butyl alcohol, methyl t-butyl ether, ethyl t-butyl ether, and methyl t-amyl ether. However, alcohols, and particularly ethanol, have become one of the most widely used oxygenates.

The term ethanol, when used herein, refers to any ethanol-containing solution that can be used in an ethanol and gasoline blend. The term thus includes starch-derived ethanol, sugar-derived ethanol, and cellulose-derived ethanol. The term ethanol may include pure ethanol, a solution comprising ethanol, an ethanol-water solution or azeotrope, nominally anhydrous ethanol, an alcohol solution comprising ethanol which may or may not include other alcohols, a solution comprising ethanol and denaturants, and other oxygenate solutions that contain ethanol. Ethanol, as used herein, may or may not comply with ASTM D4806-21 or similar specifications.

Government regulations often require that ethanol is present in finished gasoline at a certain minimum percent by volume (vol. %). Additionally, butane is a favored component in gasoline, but the quantity of butane that can be added is limited by the high vapor pressure of the butane stream (37-65 psia) and government limits on maximum allowable vapor pressure and other volatility properties for a finished gasoline. Blending ethanol and optionally, butane with a BOB to produce a finished gasoline means a refinery must produce a lower volatility BOB that will meet maximum volatility specifications for a finished gasoline once it is blended with ethanol (and optionally butane) at a blending terminal. The present processes and systems efficiently blend a finished gasoline that incorporates the maximum allowable quantity of butane that meets specifications by measuring the vapor pressure and a distillation temperature for a neat gasoline stream, while using estimates for the vapor pressure and volatility impacts of an ethanol stream and/or a butane stream that is included in the blend when the process calculates a volumetric blend ratio of the amount of each stream needed to produce a finished and/or certified gasoline that maximizes the volume of butane in the product finished gasoline while not exceeding volatility limits.

It is conventional practice in the refining industry to blend gasoline using volumetric blendstock ratios that are calculated by mathematical algorithms known as blending equations. These blending equations are well known in the refining industry and are either developed or tailored by each refiner for use in connection with available gasoline blendstocks. Blending equations typically relate the desired properties of a finished gasoline to the quantity of each blendstock in the blend utilizing as equation input either the measured or anticipated/estimated properties of each blendstock in the blend.

Some embodiments described herein relate to a process for creating a finished fuel, involving measuring one or more volatility-related properties (or characteristics) of a neat gasoline and obtaining a predicted estimate of the vapor pressure of an ethanol stream comprising ethanol and a butane stream comprising butane; calculating a volumetric blend ratio of the neat gasoline, the ethanol stream, the butane stream required to produce a finished gasoline that meets all government specifications for a finished gasoline, while minimizing the difference between the final vapor pressure of the finished fuel and regulations for maximum allowable vapor pressure; flowing each of the neat gasoline, the ethanol stream and the butane stream into a blending receptacle (e.g., tank, pipeline, vessel, truck, etc.) in an amount that implements the calculated volumetric blend ratio.

Figure 1:
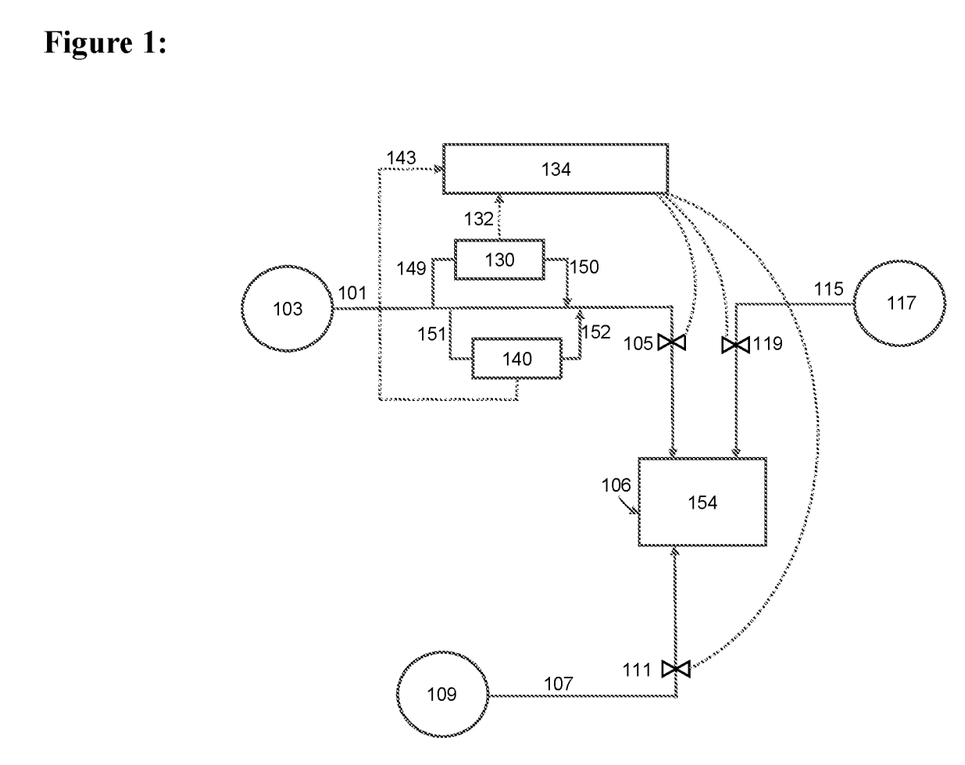
FIG. 1 is a flow diagram depicting a first illustrative embodiment of the inventive systems and methods.

A first embodiment of the system and method for decreasing octane giveaway is depicted in FIG. 1. A first pipe 101 conveys or flows a neat gasoline 103 and comprises a first valve 105 that regulates flow of the neat gasoline 103 at a known rate through the first pipe 101 into a receptacle 106. The neat gasoline 103 has an anti-knock index (AKI) that may vary depending upon geographic location but is generally in the range from 80 to 93. As used herein, the term anti-knock index is given its commonly accepted definition, which is the arithmetic mean of the research octane number and the motor octane number for that gasoline.

A second pipe 107 flows or conveys an ethanol stream 109 and comprises a second valve 111 that regulates flow of the ethanol stream 109 through the second pipe 107 at a known rate into the receptacle 106. A third pipe 115 or conduit flows a stream of butane 117 and comprises a third valve 119 that regulates the flow of the butane 117 through the third pipe 115 at a known rate into the receptacle 106.

A first analyzer 130 continually receives and analyzes samples of the neat gasoline 103 from the first pipe 101 via a first slipstream inlet conduit 149. Each sample that is analyzed is returned to the first pipe 101 via first slipstream return conduit 150. The first analyzer 130 comprises a computer processor and memory containing programming that calculates a neat gasoline vapor pressure 136. The neat gasoline vapor pressure 136 may be determined by any effective methodology, such as, but not limited to American Society for Testing and Materials methods ASTM D323, ASTM4953, ASTM D5188, ASTM D6378 or ASTM D5191.

A second analyzer 140 periodically receives and analyzes samples of the neat gasoline 103 from the first pipe 101 via a second slipstream inlet conduit 151, and each sample that is analyzed is returned to the first pipe 101 via second slipstream return conduit 152. The second analyzer 140 comprises a computer processor and memory containing programming that calculates a neat gasoline distillation temperature 143, which is the temperature at which any defined percentage of the neat gasoline is in vapor phase. In some embodiments, the distillation temperature is the temperature at which 10 vol. %, alternatively 50 vol. %, alternatively 90 vol. % of the neat gasoline is in vapor phase 1 atm. The distillation temperature may be determined by any effective methodology, such as, but not limited to American Society for Testing and Materials methods ASTM D86, ASTM D7345-17 and ASTM D1160-18. In some embodiments, each analyzer periodically analyzes a sample at a rate that maybe at least once per hour, alternatively at least once per 30 min, alternatively at least once per 15 min, alternatively, at least once per 5 min, alternatively at least once per 1 min, alternatively at least once per 30 sec, alternatively, continually or in a continuous manner.

Returning to the embodiment depicted in FIG. 1, a programmable logic controller 134 controls blending of a finished gasoline 154 in the receptacle 106. The programmable logic controller 134 receives the neat gasoline vapor pressure 132 from the first analyzer 130 and the neat gasoline distillation temperature 143 from the second analyzer 140 and takes these values into account when periodically (alternatively, continually) calculating a volumetric blend ratio to produce a finished gasoline 154. The programmable logic controller 134 or equivalent device comprises a computer processor and memory containing programming that is executed by the processor to calculate a volumetric blend ratio based upon values received for the neat gasoline vapor pressure, the neat gasoline distillation temperature, and estimated (alternatively, pre-set or predicted) values for the vapor pressure of the ethanol 109 in the second pipe 107 or the butane 117 in the third pipe 115 when calculating the first volumetric blend ratio. Importantly, the programmable logic controller 134 does not utilize contemporaneously measured values for the vapor pressure of either the ethanol 109 or the butane 117 when calculating the first volumetric blend ratio.

The volumetric blend ratio comprises a volume of the neat gasoline 103, as well as a volume of the ethanol 109 required to produce a finished gasoline 154 comprising a minimum vol. % of ethanol (where the minimum amount may vary depending upon local government regulations, but is typically 10 vol. %). The volumetric blend ratio additionally comprises the maximum volume of butane 117 that can be combined with the neat gasoline 103 and the ethanol 109 in receptacle 106 to produce the finished gasoline 154 without exceeding government regulations for maximum vapor pressure or other required volatility specifications of a finished gasoline at a particular geographic location on a given calendar date.

The programmable logic controller 134 operates to implement the calculated volumetric blend ratio by communicating with the first valve 105, the second valve 111 and the third valve 119. Each valve may comprise a valve controller (or valve positioner) that accurately and precisely controls the degree of opening for the valve it controls, thereby regulating the flow rate through each pipe and implementing the first volumetric blend ratio to produce the finished gasoline 154 in the receptacle 106. In the embodiment depicted in FIG. 1, the material flowing through each pipe (i.e., gasoline, ethanol or butane) is maintained at a constant known pressure to allow more precise rate of flow past each valve when the valve is opened a specific degree or percentage (e.g., from 1% to 100%), thereby allowing implementation of the volumetric blend ratio by the programmable logic controller 134 based upon these known invariant pressures. Each valve is preferably of a design that accurately regulates flow through the valve when adjusted by a controller or positioner that may comprise a butterfly valve, a gate valve, an orifice valve or any other valve capable of accurately and precisely regulating flow. The flow of butane may be regulated by a butane injection valve. The butane injection valve may provide butane in either a continuous manner or via periodic injections sufficient for a given batch of finished gasoline that meets all vapor pressure and other required volatility specifications.

Some embodiments may alternatively analyze the volumetric flow rate of one or more of the neat gasoline, ethanol stream and butane streams to control for potential variations in the supply pressure of material (i.e., net gasoline, ethanol or butane) in each pipe. In such embodiments, each stream may have a constant volumetric flow rate or a variable volumetric flow rate that is monitored by flow meters to measure liquid flow through each pipe at a location between each valve and the downstream receptacle. The programmable logic controller then receives these periodic flow measurements from at least one flow meter associated with each pipe. Each flow meter may be selected from a variety of conventional metering devices that include, but are not limited to, Corolis flow meters, magnetic flow meters, ultrasonic flow meters, vortex flow meters and differential pressure flow meters.

Figure 2:
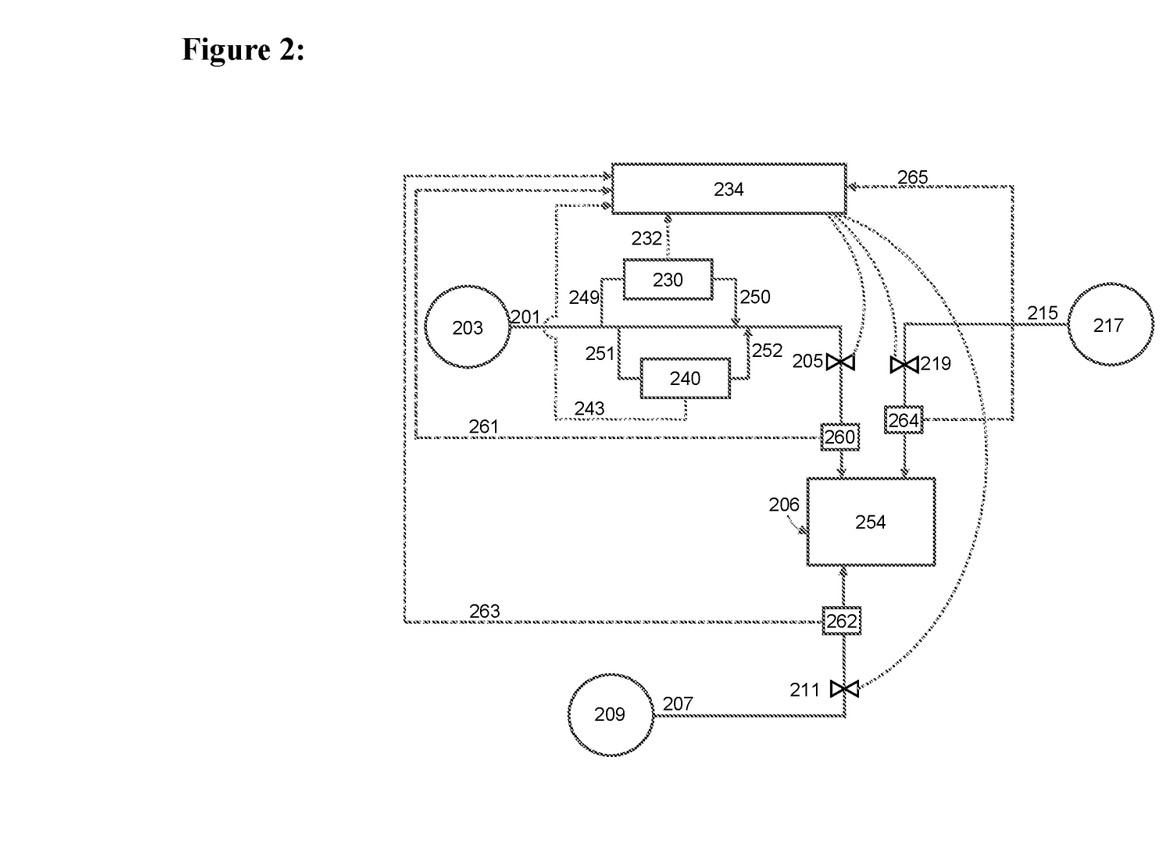
FIG. 2 is a flow diagram depicting a second illustrative embodiment of the inventive systems and methods.

A second embodiment of the system and method for decreasing octane giveaway is depicted in FIG. 2. A first pipe 201 conveys or flows a neat gasoline 203 and comprises a first valve 205 that regulates flow of the neat gasoline 203 at a known rate through the first pipe 201 into a receptacle 206. The neat gasoline 203 has an anti-knock index (AKI) that may vary depending upon geographic location but is generally in the range from 80 to 93. As used herein, the term anti-knock index is given its commonly accepted definition, which is the arithmetic mean of the research octane number and the motor octane number for that gasoline.

A second pipe 207 flows or conveys an ethanol stream 209 and comprises a second valve 211 that regulates flow of the ethanol stream 209 through the second pipe 207 at a known rate into the receptacle 206. A third pipe 215 or conduit flows a stream of butane 217 and comprises a third valve 219 that regulates the flow of the butane 217 through the third pipe 215 at a known rate into the receptacle 206.

A first analyzer 230 continually receives and analyzes samples of the neat gasoline 203 from the first pipe 201 via a first slipstream inlet conduit 249. Each sample that is analyzed is returned to the first pipe 201 via first slipstream return conduit 250. The first analyzer 230 comprises a computer processor and memory containing programming that calculates a neat gasoline vapor pressure 236. The neat gasoline vapor pressure 236 may be determined by any effective methodology, such as, but not limited to American Society for Testing and Materials methods ASTM D323, ASTM4953, ASTM D5188, ASTM D6378 or ASTM D5191.

A second analyzer 240 periodically receives and analyzes samples of the neat gasoline 203 from the first pipe 201 via a second slipstream inlet conduit 251, and each sample that is analyzed is returned to the first pipe 201 via second slipstream return conduit 252. The second analyzer 240 comprises a computer processor and memory, the memory containing programming that calculates a neat gasoline distillation temperature 243, which is the temperature at which any defined volume percentage of the neat gasoline is in vapor phase. In some embodiments, the neat gasoline distillation temperature is the temperature at which 10 vol. %, alternatively 50 vol. %, alternatively 90 vol. % of the neat gasoline is in vapor phase 1 atm. The distillation temperature may be determined by any effective methodology, such as, but not limited to American Society for Testing and Materials methods ASTM D86, ASTM D7345 and ASTM D1160.

Obtaining at least two types of volatility measurements per neat gasoline stream facilitates the ability of the programmable logic controller to predict the vapor pressure and/or distillation temperature of the finished gasoline once the neat gasoline is mixed with ethanol and optionally, butane. This allows the programmable logic controller to accurately predict the quantity of butane that can be added to produce the finished gasoline without exceeding government specifications for maximum vapor pressure or other required volatility specifications.

Returning to the embodiment depicted in FIG. 2, a programmable logic controller 234 controls blending of a finished gasoline 254 in the receptacle 206. The programmable logic controller 253 receives the neat gasoline vapor pressure 232 from the first analyzer 230 and the neat gasoline distillation temperature 243 from the second analyzer 240 and takes these values into account when periodically (alternatively, continually) calculating a volumetric blend ratio to produce a finished gasoline 254.

The programmable logic controller 234 or equivalent device comprises a computer processor and memory containing programming that is executed by the processor to calculate a volumetric blend ratio based upon values received for the neat gasoline vapor pressure, the neat gasoline distillation temperature, and estimated (alternatively, pre-set or predicted) values for the vapor pressure of the ethanol 209 in the second pipe 207 or the butane 217 in the third pipe 215 when calculating the first volumetric blend ratio. Importantly, the programmable logic controller 234 does not utilize contemporaneously measured values for the vapor pressure of either the butane 217 or the ethanol 209 when calculating the first volumetric blend ratio.

The volumetric blend ratio comprises a volume of the neat gasoline 203, as well as a volume of the ethanol 209 required to produce a finished gasoline 254 comprising a minimum vol. % of ethanol (where the minimum amount may vary depending upon local government regulations but is typically 10 vol. %). The volumetric blend ratio additionally comprises the maximum volume of butane 217 that can be combined with the neat gasoline 203 and the ethanol 209 in receptacle 206 to produce the finished gasoline 254 without exceeding government regulations for maximum vapor pressure of a finished gasoline at a particular geographic location on a given calendar date.

The programmable logic controller 234 operates to implement the calculated volumetric blend ratio by communicating with the first valve 205, the second valve 211 and the third valve 219. Each valve may comprise a valve controller (or valve positioner) that accurately and precisely controls the degree of opening for the valve it controls, thereby regulating the flow rate through each pipe and implementing the first volumetric blend ratio to produce the finished gasoline 254 in the receptacle 206. Each valve is preferably of a design that accurately regulates variable flow through the valve when regulated by a controller or positioner, that may comprise a butterfly valve, gate valve an orifice valve or any other valve capable of accurately and precisely regulating flow. The flow of butane may be regulated by a butane injection valve. The butane injection valve may provide butane in either a continuous manner or via periodic injections sufficient for a given batch of finished gasoline that meets all vapor pressure and other required volatility specifications.

Further referring to the embodiment depicted in FIG. 2, a first flow meter 260 measures the pressure of the neat gasoline 203 in the first pipe 201 downstream from the first valve 205. First flow meter 260 sends a neat gasoline flow rate signal 261 to programmable logic controller 234. A second flow meter 262 measures the flow of the ethanol 209 in the second pipe 207 downstream from the second valve 211 and sends an ethanol flow rate signal 263 to programmable logic controller 234. A third flow meter 264 measures the pressure of the butane 217 in the third pipe 215 downstream from the third valve 219 and sends a butane flow rate signal 265 to programmable logic controller 234. Programmable logic controller 234 receives each flow rate measurement, and its programming considers each flow rate measurement when sending a signal to adjust the degree or percentage (i.e., 1-100%) to which each valve is opened to implement the calculated volumetric blend ratio. Each valve is preferably of a design that accurately regulates flow through the valve when adjusted by a controller or positioner that may comprise a butterfly valve, a gate valve, an orifice valve or any other valve capable of accurately and precisely regulating flow. The flow of butane may be regulated by a butane injection valve. The butane injection valve may provide butane in either a continuous manner or via periodic injections sufficient for a given batch of finished gasoline that meets all vapor pressure and other required volatility specifications.

Gasoline is comprised of a complex mixture of volatile hydrocarbons such as aromatics, olefins, naphthenes and paraffins, with reformulated gasoline most often containing an oxygen-containing compound that is suitable for use as a fuel in a spark-ignition internal combustion engine. Gasoline typically boils over a temperature range of about room temperature to about 437° F. because gasoline is typically composed of a mixture of numerous hydrocarbons having different boiling points at atmospheric pressure. Thus, a gasoline fuel boils or distills over a range of temperatures, unlike a pure compound. This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used.

The present methods and systems are capable of producing a finished motor gasoline that may include oxygenates such as ethanol, as defined in ASTM Specification D 4814 or Federal Specification VV-G-1690C. When the first finished gasoline is a premium octane finished gasoline, the volumetric blend ratio produces a finished gasoline having an AKI that is typically in the range from 91-95. When the first finished gasoline is a mid-grade octane finished gasoline, the volumetric blend ratio produces a gasoline having an AKI that is typically in the range from 88-90. When the first finished gasoline is a regular octane finished gasoline, the volumetric blend ratio produces a gasoline having an AKI that is typically in the range from 85-87. When the first finished gasoline is a premium octane finished gasoline, the volumetric blend ratio produces a gasoline having an AKI that is typically in the range from 91-95. When the first finished gasoline is a mid-grade octane finished gasoline, the volumetric blend ratio produces a gasoline having an AKI that is typically in the range from 88-90. When the first finished gasoline is a regular octane finished gasoline, the volumetric blend ratio produces a gasoline having an AKI that is typically in the range from 85-87.

In some embodiments, each analyzer receives a slipstream of the neat gasoline that is analyzed via a slipstream inlet conduit from the first pipe, where the sample that is analyzed in the analyzer is soon thereafter returned to the first pipe via a slipstream return conduit. The second analyzer is a distinct type of analyzer from the first analyzer and provides a distinct type of volatility measurement that is a distillation temperature (e.g., T10, T50, T90). Each analyzer rapidly analyzes a sample to produce spectral data comprising a set of discrete digitized data points. By utilizing a technology that can analyze samples of a gasoline stream with high frequency, the system receives rapidly updated and reliable data regarding the octane number(s) of the neat gasoline being analyzed. In some embodiments, the vapor pressure and distillation temperature measurements are performed by the same analyzer.

Any vapor pressure analysis of gasoline disclosed herein is performed in accordance with applicable EPA regulations and American Society for Testing and Materials ("ASTM") methods in force as of the date of the application. For measuring the Reid vapor pressure of reformulated gasoline, ASTM standard method D 5191, entitled "Standard Test Method for Vapor Pressure of Petroleum Products (Mini Method)" is preferred. The following correlation must also be used to satisfy EPA regulations:

$$RVPEPA=(0.956*RVPASTM)-2.39 \text{ kPa}$$

A typical volatility analyzer for measuring vapor pressure is the Minivap Online analyzer manufactured by Grabner® Instruments. Generally, a pump draws a sample of at least one neat gasoline into the analyzer for analysis, followed by return of the sample to the first or second pipe. In some embodiments, the vapor pressure measured may be Reid vapor pressure.

Some embodiments may comprise calculating a distillation temperature that may be accomplished by either direct contact between the analyzer and a neat gasoline stream or by drawing a slip-stream sample from a gasoline stream, measuring one or more properties of the sample, and returning the sample to the gasoline stream. Distillation properties measured may be, but are not limited to, the 10% distillation point ("T10"), the 50% distillation point ("T50"), and the 90% distillation point ("T90") as defined by the ASTM D 86-95 procedure, or by conventional alternative procedures. 10% distillation temperature (i.e., the temperature at which 10% of the fuel composition evaporates) (T10), the 50% distillation temperature (i.e., the temperature at which 50% of the fuel composition evaporates) (T50), and 90% distillation temperature (i.e., the temperature at which 90% of the fuel composition evaporates) (T90).

Throughout this patent application, whenever an analysis of gasoline is disclosed, the analysis can be performed in accordance with applicable EPA regulations, American Society for Testing and Materials ("ASTM"), and American Petroleum Institute ("API") methods and standards.

In some embodiments, a programmable logic controller can include a computer processor coupled to a memory [e.g., random access memory (or "RAM"), read only memory, (or "ROM") etc., that can store program code (or programming) comprising one or more algorithm(s) that when executed by the computer processor controls implementation of blending the finished fuel. The program code is executed by the processor to calculate the first volumetric blend ratio based upon vapor pressure and distillation temperature measurements for the neat gasoline and estimates of vapor pressure for both the butane and the ethanol. In some embodiments, data received from sensors that measure at least one of the vapor pressure and the distillation temperature for the neat gasoline may be incorporated into the algorithm that is executed by the processor of the programmable logic controller. Information representing desirable or predetermined properties of a finished fuel may be supplied as inputs to the programming.

In instances where the vapor pressure of the finished gasoline to be produced is projected to meet or exceed the maximum vapor pressure for a finished gasoline that are allowed by government specifications following blending of ethanol, the blending of additional butane is prevented by the inventive processes and systems. Important to the present processes and systems is that the programmable logic controller does not receive octane number measurements or vapor pressure measurements of the butane in the third pipe, nor does the programmable logic controller receive octane number measurements or vapor pressure measurements of the ethanol in the second pipe in order to calculate the volumetric blend ratio. Instead, the programmable logic controller utilizes assigned estimated values that approximate the vapor pressure of the butane and the ethanol when calculating the volumetric blend ratio. This decreases capital and operational costs for the system and process.

Computers and controller embodiments herein may feature routines, programs, objects, components, data structures, and the like, which perform particular tasks or implement control or determination operations. Computer executable instructions, associated data structures, and program modules represent examples of the program code means for executing acts of the methods disclosed herein. Computing devices within certain embodiments may include general or more specific computing systems, which may include: a processing unit, a system memory, and a system bus that couples various system components including the system memory to the processing unit. Processing units can execute computer-executable instructions designed to implement features of computer system, including features of the present invention. The system bus may be any of several types of bus structures including a memory bus or memory controller, a peripheral bus, and a local bus using any of a variety of bus architectures. The system memory includes read only memory ("ROM") and random access memory ("RAM"). A basic input/output system ("BIOS"), containing the basic routines that help transfer information between elements within computer system, such as during start-up, may be stored in ROM.

The computer system may also include hard disk drive (or other storage media such as a solid-state disk) for reading from and writing to hard disk, disk drive for reading from or writing to removable disk, and optical disk drive for reading from or writing to removable optical disk, such as, for example, a CD-ROM or other optical media. The hard disk drive, disk drive, and optical disk drive may be connected to the system bus by hard disk drive interface, disk drive-interface, and optical drive interface, respectively. The drives and their associated computer-readable media provide nonvolatile storage of computer-executable instructions, data structures, program modules, and other data for the computer system. Although the example environment described herein employs hard disk, removable disk and removable optical disk, other types of computer readable media for storing data can be used. In some embodiments, the computer system may be connectable to computer networks, such as, for example, an office-wide or enterprise-wide computer network, an intranet, and/or the Internet. Computer system can exchange data with external sources, such as, for example, remote computer systems, remote applications, and/or remote databases over such computer networks. In some embodiments, a computer system may include network interface, through which computer system receives data from external sources and/or transmits data to external sources. The network interface facilitates the exchange of data with remote computer system. Network interface can logically represent one or more software and/or hardware modules, such as, for example, a network interface card and corresponding Network Driver Interface Specification ("NDIS") stack. Similarly, in some embodiments, the computer system includes input/output interface, through which the computer system receives data from external sources and/or transmits data to external sources.

In some embodiments, program code comprising one or more program modules may be stored on hard disk, disk drive, optical disk, ROM or RAM, including an operating system, one or more application programs, other program modules, and program data. In one embodiment, a user may enter commands and information into computer system through keyboard, pointing device, or other input devices, such as, for example, a microphone, joystick, game pad, scanner, or the like. These and other input devices can be connected to the processing unit through input/output interface coupled to system bus. Input/output interface logically represents any of a wide variety of different interfaces, such as, for example, a serial port interface, a PS/2 interface, a parallel port interface, a Universal Serial Bus ("USB") interface or may even logically represent a combination of different interfaces.

In some embodiments, a monitor or other display device may also be connected to system bus via video interface. Other peripheral output devices, such as, for example, printers, can also be connected to computer system.

A control system may include one or more controllers and may optionally be connected to one or more sensors such as flow rate monitors (meters) and temperature monitors. These connections may take place via wired or wireless communications systems. Alternatively, these connections may take place via pneumatic linkage, magnetic connection, or through other methods known in the art. A control system may include a combination of software and hardware within a network to balance the industrial infrastructure. In some embodiments, control systems may include one or more of the following: as programmable logic controllers (PLCs), supervisory control and data acquisition (SCADA), industrial automation and control systems (IACS), remote terminal units (RTUs), intelligent electronic devices (IEDs) control severs, and sensors. PLCs are capable of performing various industrial applications with inbuilt modules like power supply, CPU, I/O modules, and other communication modules. The PLCs can be integrated or modular. A modular PLC is compact and fixed with limited I/O functions, whereas integrated PLC extends I/O modules based on its features. The input module may be connected with sensors, while actuators or other output devices are optionally connected with the output module.

SCADA systems may be used for monitoring long-distance field sites through a centralized mechanism. They generally contain devices such as PLCs or other commercial hardware modules to be distributed in various locations. They are known to provide capabilities of supervision at the supervisory level.

Distributed control systems (DCS) may also be employed. These systems are typically used to control productions in one location. The desired set point is maintained to be sent to the controller or actuator instructing valves. This data may be retained for future references or used in advanced control strategies. A supervisory control loop may be used by each DCS to manage multiple local devices or controllers. Furthermore, a DCS is capable of eliminating the impact of a single fault on the whole system.

In the scenario where more than one controller is implemented in a control system, the more than one controller can be interconnected with other controls, or the more than one controller can be independent from other controllers. A variety of control systems may be featured in the embodiments. The embodiments can be realized in hardware, software, or a combination of hardware and software. Embodiments can be realized in a centralized fashion in one computer system, or in a distributed fashion where different elements are spread across several interconnected computer systems. Any kind of computer system, or other apparatus adapted for carrying out the methods described herein, is suited to perform the functions described herein.

The term gasoline, when used herein, refers to any refined liquid petroleum product can be used as fuel in an internal combustion engine, non-limiting examples of which include finished fuels with an anti-knock index (AKI) between 80 and 95, finished fuels with an AKI between 80 and 85, finished fuels with an AKI between 85 and 90, and finished fuels with an AKI between 90 and 95. The term includes products that consist mostly of aliphatic components, as well as products that contain aromatic components and branched hydrocarbons such as iso-octane. The term also includes all grades of conventional gasoline, reformulated gasoline ("RFG"), diesel fuel, biodiesel fuel, jet fuel, and transmix. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. Gasolines for ethanol blending can be gasolines used to create virtually any type of gasoline and ethanol blend.

In some embodiments, a fuel-grade ethanol (that may contain about 95% ethanol in combination with a denaturant and other alcohols) is added to a BOB (or neat gasoline) to produce a finished gasoline containing ethanol. In some embodiments, the target desired amount of alcohol in the finished gasoline product (e.g., 10 vol. %) is pre-calculated. The blend stock of gasoline is specifically formulated based on this desired quantity of ethanol, so that combined with an assumption of the volatility of the ethanol stream and the volatility of a butane stream, a known volume of the ethanol stream and/or butane stream can be blended with the neat gasoline to produce a finished gasoline product. This can take place as either a continuous or a batch process.

In the practice of the inventive process and systems, the finished ethanol-containing gasoline can be prepared by mixing any desired amount of ethanol with the relatively ethanol-free neat gasoline. For example, the finished gasoline could contain 1 vol. %, 10 vol. %, 50 vol. %, 95 vol. %, or any amount in between those values, or any other vol. % of ethanol that might be desired. However, it will be appreciated that the invention will typically be most useful in manufacturing ethanol-containing gasoline for distribution to motorists. Accordingly, the finished gasoline will usually contain an amount of ethanol that yields an oxygen content that conforms to all applicable government specifications.

The finished gasoline can be blended to achieve any octane rating (R+M)/2 (average of the motor octane rating and research octane rating) desired. A regular gasoline with an octane rating of at least 85, a mid-grade gasoline with an octane rating of at least 88 or 90, or a premium gasoline with an octane rating of at least 91 can all be prepared in accordance with the present invention. In other embodiments, the composition has an octane rating of at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 and useful ranges can be selected between any of these values (for example, from about 80 to about 110, or from about 87 to about 105). Octane rating standards and methods for measuring octane rating are known, and can include, but are not limited to, those described in ASTM D-4814, D-2699 and D-2700 and can include accepted reference values for numbers greater than 100.

For calculated volumetric blend ratios that include at least some butane, the butane may be supplied by one or multiple sources of butane, which in some embodiments may be provided via a butane storage vessel or pipeline that is at a higher pressure than the pressure of the neat gasoline stream such that the butane is mixed with at least one neat gasoline stream at a known rate. In some embodiments this mixing occurs prior to the neat gasoline and the butane being received by the receptacle along with ethanol to produce a finished gasoline. The addition of butane and ethanol to a receptacle for blending may occur at any point or in any order relative to the neat gasoline stream.

Blending of each finished and/or certified gasoline may optionally be accomplished by splash blending into each receptacle. In some embodiments the receptacle may be located at a commercial fuel blending terminal because ethanol is ill-suited to pipeline transportation. The finished and/or certified gasoline may be blended from a petroleum-based blendstock for oxygenate blending (BOB) having a minimum octane number that will meet finished and/or certified gasoline specifications after addition of a specified amount of ethanol (e.g., 10 vol. %), and optionally, butane. The BOB can be transported to the commercial fuel blending terminal either via pipeline or in batches (i.e., by vehicle).

A substantially hydrocarbon precursor blend that can be converted to a finished gasoline by mixing with one or more oxygenates (including alcohols) is referred to herein alternatively as a "subgrade" a BOB or as a neat gasoline. Neat gasoline is defined as a gasoline blend that contains no ethanol. The combination of the subgrade, BOB or neat gasoline with the ethanol yields a finished gasoline. In some embodiments, the BOB comprises at least 80 vol. % of a mixture of hydrocarbons. The term "neat gasoline source" when used herein refers to a source of neat gasoline from any location, storage tank, vessel, container, or any point along a petroleum pipeline.

The subgrade or BOB is commonly called a RBOB (Reformulated Blendstock for Oxygenate Blending) when the finished gasoline product is destined for a reformulated gasoline market in the U.S. In other words, a subgrade includes (1) individual refinery streams suitable for use as a blend stock for gasoline, and/or (2) a blended gasoline stream formed by blending two or more streams, each of which are suitable for use as a gasoline blend stock. A suitable gasoline blend stock, when blended with other refinery streams, produces a neat gasoline that meets government specifications for a motor gasoline, as documented in Federal and State regulations. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. The terms "gasoline blendstock," "oxygenate free blend stock," "subgrade," "subgrade blend," "reformulated blendstock for oxygenate blending (RBOB)," "blendstock for oxygenate blending (BOB)," "blendstock," "gasoline fraction" and neat gasoline are used interchangeably to mean a substantially hydrocarbon precursor blend which can be converted to a finished gasoline product by mixing with one or more oxygenates (including alcohols). The terms "blendstock" and "blend stock" are used interchangeably and have the same meaning.

Typically, a BOB has a decreased octane number (or AKI) that is offset by the increased octane number of an octane increase when blended with ethanol. Splash blending alters the quality (e.g. heating value, distillation curve, vapor pressure) of finished gasoline, but in the present process, the final blends of finished gasoline containing ethanol will meet ASTM specifications. In some embodiments, this may be assured by utilizing a neat gasoline for blending that has decreased vapor pressure such that the product finished gasoline remains below volatility limits after blending with more volatile ethanol and/or butane. In some embodiments, the refined products, gasoline blendstock or neat gasoline that flows through the first and second pipe can be any liquid or gaseous product that can be derived from crude oils through refining processes such as catalytic cracking and fractional distillation. These products can have physical and chemical characteristics that differ according to the type of crude oil and subsequent refining processes.

The gasoline blendstocks described herein typically have a normal boiling point within the range of 0° C. and 260° C., as determined by an ASTM D86 distillation. Feeds of this type include light naphtha typically having a boiling range of about C6 to 165° C. (330° F.); full range naphtha typically having a boiling range of about C5 to 215° C. (420° F.), heavier naphtha fractions boiling in the range of about 125° C. to 210° C. (260° F. to 412° F.), or heavy gasoline fractions boiling at, or at least within, the range of about 165° C. to 260° C. (330° F. to 500° F.), preferably about 165° C. to 210° C. In general, a gasoline fuel will distill over the range of from about room temperature to 260° C. (500° F.). In some embodiments, these streams may be treated to remove sulfur, nitrogen, and other undesired components.

Gasoline fractions for use as blendstocks to make the neat gasoline described herein may include C3 to C9 and larger hydrocarbons. In this application, the term "C(number)" means a hydrocarbon solution comprising hydrocarbon molecules having that number of carbon atoms, but not necessarily a pure solution. For example, refinery streams are usually separated by fractional distillation. A light naphtha cut is one such refinery stream, and because such a cut often contains compounds that are very close in boiling points, the separations are not precise. The light naphtha refinery cut is valuable as a source of iso-olefins (iC5 and iC6 compounds, for example) for forming an ether by reaction with ethanol.

Thus, a C5 stream, for instance, may include C4 and up to C8 and higher. These hydrocarbon components may be saturated (alkanes), unsaturated (mono-olefins, including iso-olefins), and poly-unsaturated (diolefins, for example). Additionally, the components may be any or all of the various isomers of the individual compounds. Such a mixture may easily contain 150 to 200 components. Other hydrocarbon streams of C4 to C9 carbon atoms may be used in embodiments disclosed herein.

In some embodiments, gasoline blendstocks utilized to make a neat gasoline may include a C4 cut, which may include C3 to C5 or higher hydrocarbons (i.e., C6+). In other embodiments, gasoline fraction blendstocks may include a C5 cut, which may include C4 to C8 or higher hydrocarbons, including olefins. In other embodiments, gasoline fractions may include a C6 cut, which may include C4 to C9 or higher hydrocarbons, including olefins. In other various embodiments, gasoline fractions may include mixtures of one or more of C4, C5, C6, and C7+ hydrocarbons, where the mixture includes olefinic compounds. The above-described streams may include C4 to C7 streams, gasoline fractions, FCC gasoline, coker gasoline, and other refinery streams having similar properties. In some embodiments, the neat gasoline may include a concentration of 1 to 45 weight percent etherifiable iso-olefins; a concentration of 10 to 30 weight percent iso-olefins in other embodiments; and a concentration of 15 to 25 weight percent iso-olefins in yet other embodiments.

As disclosed herein, there are a number of principal methods for assessing the volatility of gasoline: (1) measuring the vapor-liquid ratio, (2) measuring the vapor pressure, and (3) measuring the distillation temperature. The vapor-liquid ratio (V/L) is an evacuated chamber method for determining temperatures for a vapor-liquid ratio of 20 to 1. It can be tested using ASTM D5188 or calculated using the distillation and vapor pressure data as described in ASTM D4814. The Reid method is a standard test for measuring the vapor pressure of petroleum products. Reid vapor pressure (RVP) is related to true vapor pressure but is a more accurate assessment for petroleum products because it considers sample vaporization as well as the presence of water vapor and air in the measuring chamber. The distillation temperature is another important standard for measuring the volatility of petroleum products. When blending gasoline with volatility modifying agents, the distillation temperature (TD) often cannot fall below a prescribed value. TD refers to the temperature at which a given percentage of gasoline volatilizes under atmospheric conditions and is typically measured in a distillation unit. For example, the gasoline can be tested for T(50), which represents the temperature at which 50% of the gasoline volatilizes, or it can be measured at T(10), T(90), or some other temperature value. If the distillation temperature is a T50, it typically is in the range from 150° F. to 260° F. for each of a regular neat gasoline stream and a premium neat gasoline stream prior to blending. In some embodiments, the system and process further comprises a computer processor that executes programming comprising a database containing information regarding allowable maximum vapor pressure for the finished gasoline given the calendar date and geographic location, where the processor calculates the volumetric blend ratio based upon the maximum vapor pressure for the date and location. Preferably, the computer processor that performs this calculation is the same computer processor that calculates and implements the volumetric ratio to affect the production of the finished gasoline.

In embodiments, the finished gasoline comprises an alcohol that is preferably ethanol, comprising a concentration of at least about 0.01, 0.1, 0.2, 0.3, 0.4, 0.5, 0.6, 0.7, 0.8, 0.9, 1.0, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 99 or 100 vol. % based on the total volume of the composition (v/v %), and useful ranges can be selected between any of these values (for example, about 0.01 vol. % to about 99 vol. %, about 0.01 vol. % to about 1 vol. %, about 0.1 vol. % to about 10 vol. %, about 0.5 vol. % to about 10 vol. %, about 1 vol. % to about 5 vol. %, about 5 vol. % to about 25 vol. %, about 5 vol. % to about 95 vol. %, about 5 vol. % to about 80 vol. %, about 10 vol. % to about 95 vol. %, about 15 vol. % to about 95 vol. %, about 20 vol. % to about 95 vol. %, about 25 vol. % to about 95 vol. %, about 30 vol. % to about 95 vol. %, about 35 vol. % to about 95 vol. %, about 40 vol. % to about 95 vol. %, about 45 vol. % to about 95 vol. %, about 50 vol. % to about 95 vol. %, about 1 vol. % to about 99 vol. %, about 5 vol. % to about 99 vol. %, about 10 vol. % to about 99 vol. %, about 15 vol. % to about 99 vol. %, about 20 vol. % to about 99 vol. %, about 25 vol. % to about 99 vol. %, about 30 vol. % to about 99 vol. %, about 35 vol. % to about 99 vol. %, about 40 vol. % to about 99 vol. %, about 45 vol. % to about 99 vol. %, about 50 vol. % to about 99 vol. %, about 5 vol. % to about 70 vol. %, about 10 vol. % to about 70 vol. %, about 15 vol. % to about 70 vol. %, about 20 vol. % to about 70 vol. %, about 25 vol. % to about 70 vol. %, about 30 vol. % to about 70 vol. %, about 35 vol. % to about 70 vol. %, about 40 vol. % to about 70 vol. %, about 45 vol. % to about 70 vol. %, and about 50 vol. % to about 70 vol. %, about 60 vol. % to about 90 vol. % based on the total volume of the composition). The concentration of alcohol, and preferably ethanol, can be readily determined and, in some embodiments, depends on the desired alcohol content of the finished fuel.

The most straightforward way to incorporate ethanol and/or butane into gasoline is by mixing, or "splash blending," which is utilized in one aspect of the invention. Various subgrades of gasoline, including catalytically cracked naphtha, reformate, virgin naphtha, isomerate, alkylate, and others are mixed with a desired amount of alcohol at a mixing site. The blending site may be geographically proximate to the area from which the gasoline is to be distributed but could also be geographically distant from the place where the subgrade is prepared. In one embodiment, the resulting blend is passed to a suitable storage facility such as a holding tank, or to an element of a distribution system, such as a pipeline, rail car, tanker truck, or barge. Splash blending is accomplished by manually loading individual components in the proper proportions according to the finished product recipe. Components are normally added one at a time through discrete product meters and loading arms.

Other blending methods, which represent other aspects of the embodiments disclosed herein, include automatic sequential blending, on rack ratio blending, side stream blending, hybrid ratio blending, hybrid stream side blending, proportional blending, and non-proportional blending, among other arrangements known by those having skill in the art.

Automatic sequential blending is accomplished by loading individual components in the proper proportion according to the finished product recipe. This is accomplished by opening product line block valves one at a time through one meter/load arm position in a set sequence to complete the finished product.

On rack ratio blending is accomplished by simultaneously combining two or more products through dedicated unique meters in respective amounts and flow rates according to the finished product recipe. This is accomplished at the individual loading position while delivering into a truck or rail car. This process is typically automated.

Side stream blending is accomplished by simultaneously combining a minor product flow through a dedicated flow meter and control valve upstream of the major products meter and control valve. The minor product flow is controlled based on the blended stream. This process is typically automated.

Hybrid ratio blending is accomplished by simultaneously combining a ratio product with a sequential product stream through unique meters and control valves in respective amounts and flow rates according to the finished product recipe. This is accomplished at the individual loading position while delivering into a truck or rail car. This process is typically automated.

Hybrid side stream—The blending is accomplished by simultaneously combining a ratio/minor product through a dedicated meter and control valve with a sequentially blended product upstream of the final blend meter and control valve. The two respective streams are proportionally blended according to the finished product recipe. This is accomplished at the individual loading position while delivering into a truck or rail car. This process is typically automated.

Proportional blending—In this blending method, the flow of each component is controlled by the preset to ensure the final desired blend ratio is maintained throughout the entire loading process. The advantage is that the product being loaded is on specification throughout the entire course of the load.

Non-proportional blending—In this blending method, the flow of each component is controlled by the preset, similar to the proportional method; however, some components may be loaded at a fixed flow rate or sequentially rather than being loaded proportionally throughout the course of the load. The potential disadvantage is that the product being loaded may not meet final specification until the completion of the load.

In some embodiments, a terminal may include many pieces of equipment designed to safely offload fuel from multiple transportation modes, store it, and load it into trucks for delivery to fuel stations. Some of the most common equipment at terminals in various embodiments are: pipes, valves, meters, sensors, and pumps, but there are others known to those skilled in the art. Pipes, usually made of steel with welded joints, move fuel to storage tanks and deliver fuel to the loading rack. Valves are used throughout the system to control the flow of fuel. Meters measure the flow rate of fluids and controllers regulate the flow rate of fuel (fluids) to ensure an accurate blend, and pumps move fuel throughout the terminal. Controllers are implemented at various points in the system to receive operational inputs (e.g., desired gasoline/alcohol ratios, octane desired, flow-rates, volumes, temperatures, pressures, chemical compositions, and other characteristics) and the controllers may also control system implementations such as valves, pumps and other operational equipment for desired outputs. Flow meters (monitors) in the embodiments herein may include oval gear meters, orifice-square edge, orifice-conic edge, venturi, pitot tube, electromagnetic, turbine, ultrasonic-transient time, Doppler, rotometer, vortex, or Coriolis flow meters. Flow meters may also include ultrasonic or ultrasound flow meters, intrusive or humidified flow meters, venturi channels, overflow plates, radar flow meters, Coriolis flow meters, differential pressure flow meters, magnetic inductive flow meters and other types of flow meters. It is understood that other suitable flow meters known to those skilled in the art may also be used. The control system may include controllers, meters or sensors, pumps, valves, wiring or wireless connection/connectivity components, computers, and other components to control the flow of fluids.

As used herein, the term periodically means intermittently, or more specifically, an interval of time between repetitive events that may range from 1 millisecond to 24 hours.

Various embodiments of the inventive systems and methods are described herein and include features and concepts that may also be included in equivalents that are not specifically disclosed, but would be obvious to one having average skill in the art.

Every feature or limitation of the systems and processes described herein has been contemplated by the inventors and envisioned to be fully operable in combination with any other feature or limitation in combinations of two or more features that may not be explicitly disclosed herein as part of a single embodiment. Any feature or limitation of the inventive processes or systems described herein, whether integral or optional, is to be considered fully compatible with and/or operable in combination with any other described feature or limitation unless specifically stated herein.

We claim:

1. A process for blending a finished gasoline, comprising:
    flowing of a neat gasoline through a first pipe comprising a first valve that regulates the flowing of the neat gasoline into a receptacle;
    flowing ethanol through a second pipe comprising a second valve that regulates the flowing of the ethanol into the receptacle;
    flowing butane through a third pipe comprising a third valve that regulates the flowing of the butane into the receptacle;
    analyzing a sample of the neat gasoline periodically to obtain a neat gasoline vapor pressure and a neat gasoline distillation temperature;
    calculating a volumetric blend ratio of the neat gasoline, the ethanol and the butane needed to produce a finished gasoline,
        wherein the calculating occurs periodically and accounts for the neat gasoline vapor pressure, the neat gasoline distillation temperature, an estimated volatility value for the ethanol and an estimated volatility value for the butane when calculating the volumetric blend ratio, wherein each volatility value is selected from a vapor pressure, a distillation temperature and a liquid-to-vapor ratio temperature;
    blending a finished gasoline comprising the neat gasoline, the ethanol and the butane by implementing the volumetric blend ratio via operation of the first valve, the second valve and the third valve to produce the finished gasoline in the receptacle,
        wherein the finished gasoline meets all government volatility-related specifications for a finished gasoline and is selected from a finished premium octane blended gasoline, a finished mid-grade octane blended gasoline, and a finished regular octane blended gasoline.

2. The process of claim 1, wherein the neat gasoline distillation temperature is selected from the group consisting of a 10 percent distillation temperature, a 50 percent distillation temperature and a 90 percent distillation temperature.

3. The process of claim 1, wherein the flowing of each of the neat gasoline, the ethanol and the butane is performed at a known rate.

4. The process of claim 1, wherein implementing the volumetric blend ratio additionally comprises obtaining a neat gasoline volume from a first flow meter in the first pipe, obtaining an ethanol volume from a second flow meter in the second pipe, and obtaining a butane volume from a third flow meter in the third pipe.

5. The process of claim 1, wherein the volatility-related specifications comprise vapor pressure, a 50 percent distillation temperature and a 20:1 vapor to liquid ratio temperature.

6. The process of claim 1, wherein the finished gasoline is selected from the group consisting of a finished premium octane blended gasoline, a finished mid-grade octane blended gasoline, and a finished regular octane blended gasoline.

7. The process of claim 1, wherein the periodically calculating occurs at a frequency of at least once per minute.

8. A process for blending a finished gasoline, comprising: flowing of a neat gasoline through a first pipe comprising a first valve that regulates the flowing of the neat gasoline into a receptacle; flowing ethanol through a second pipe comprising a second valve that regulates the flowing of the ethanol into the receptacle; flowing butane through a third pipe comprising a third valve that regulates the flowing of the butane into the receptacle; analyzing a sample of the neat gasoline periodically to obtain a neat gasoline vapor pressure and a neat gasoline distillation temperature; calculating a volumetric blend ratio of the neat gasoline, the ethanol and the butane needed to produce a finished gasoline using a programmable logic controller comprising programming, wherein the programmable logic controller periodically executes the programming comprising an algorithm that calculates the first volumetric blend ratio, wherein the algorithm accounts for the neat gasoline vapor pressure, the neat gasoline distillation temperature, a pre-determined volatility value for the ethanol and a pre-determined volatility value for the butane, wherein each volatility value is selected from a vapor pressure, a distillation temperature and a liquid-to-vapor ratio temperature; producing a finished gasoline in the receptacle that comprises the neat gasoline, the ethanol and the butane, wherein the programmable logic controller operates the first valve, the second valve and the third valve to implement the volumetric blend ratio, wherein the finished gasoline meets all volatility-related specifications for a finished gasoline and is selected from a finished premium octane blended gasoline, a finished mid-grade octane blended gasoline, and a finished regular octane blended gasoline.

9. The process of claim 8, wherein the volatility-related specifications comprise vapor pressure, a 50 percent distillation temperature and a 20:1 vapor to liquid ratio temperature.

10. The process of claim 8, wherein the neat gasoline distillation temperature is selected from the group consisting of a 10 percent distillation temperature, a 50 percent distillation temperature and a 90 percent distillation temperature.

11. The process of claim 8, wherein the periodically calculating occurs at a frequency at least once per minute.

12. The process of claim 8, wherein the flowing of each of the neat gasoline, the ethanol and the butane is performed at a known rate.

13. The process of claim 8, wherein the first pipe comprises a first flow meter downstream from the first valve that obtains a first flow measurement, wherein the second pipe comprises a second flow meter downstream from the second valve that obtains a second flow measurement, and the third pipe comprises a third flow meter downstream from the third valve that obtains a third flow measurement, wherein the programmable logic controller utilizes the first flow measurement, the second flow measurement and the third flow measurement to implement the volumetric blend ratio in the receptacle.

\* \* \* \* \*